United States Patent [19]

Short

[11] Patent Number: 4,916,914
[45] Date of Patent: Apr. 17, 1990

[54] ROTARY DISPLACEMENT COMPRESSION HEAT TRANSFER SYSTEMS INCORPORATING HIGHLY FLUORINATED REFRIGERANT-SYNTHETIC OIL LUBRICANT COMPOSITIONS

[75] Inventor: Glenn D. Short, Midland, Mich.

[73] Assignee: CPI Engineering Services, Inc., Midland, Mich.

[21] Appl. No.: 199,514

[22] Filed: May 27, 1988

[51] Int. Cl.[4] ............................................. F25B 43/02
[52] U.S. Cl. ........................................ 62/84; 62/114; 62/468; 62/502; 252/58; 252/68
[58] Field of Search ............. 62/114, 502, 468, 84; 252/58, 68

[56] References Cited

U.S. PATENT DOCUMENTS

| | | | |
|---|---|---|---|
| 3,912,617 | 10/1975 | Mulls et al. | 208/14 |
| 3,945,216 | 3/1976 | Schibbye | 418/97 |
| 4,248,726 | 2/1981 | Uchinuma et al. | 252/52 A |
| 4,267,064 | 5/1981 | Sasaki et al. | 252/52 A |
| 4,302,343 | 11/1981 | Carswell et al. | 252/33.4 |
| 4,359,394 | 11/1982 | Gainer et al. | 252/54 |
| 4,428,854 | 1/1984 | Enjo et al. | 252/69 |
| 4,431,557 | 2/1984 | Shimizu et al. | 252/52 A |
| 4,452,712 | 6/1984 | Laemmle | 252/49.3 |
| 4,454,052 | 6/1984 | Shoji et al. | 252/68 |
| 4,455,129 | 6/1984 | Sakitani et al. | 418/82 |
| 4,497,721 | 2/1985 | Katayama | 252/52 R |
| 4,510,062 | 4/1985 | Nakanishi | 252/45 |
| 4,557,850 | 12/1985 | Ando et al. | 252/68 |
| 4,689,964 | 9/1987 | St. Pierre | 62/502 |
| 4,755,316 | 7/1988 | Magid et al. | 252/68 |

FOREIGN PATENT DOCUMENTS 51795   3/1982 Japan .

OTHER PUBLICATIONS

Mobil Refrigeration Compressor Lubrication etc., Mobil Oil Corp., 1980.
Draft Report Chlorofluorocarbon Chemical Substitutes EPA 12/4/1986.
Fundamentals of Lubrication etc., Kruse et al., Rev. Int. Froid, vol. 8, 1985.
Performance Simulations of Twin Screw Compressors etc., S. Jonnson, VDI Berichte NR 640, 1987.
1980 Ashrae Systems Handbook, pp. 32.4 and 32.10, Fundamentals of Lubrication in Refrigerating Systems and Heat Pumps.
H. H. Kruse and M. Schroeder-Ashrae Transactions, vol. 90, Part 2B, pp. 763-783, 1984.
Evaluation of Lubricants for Refrigeration and Air Conditioning Compressors; H. O. Spauschuns, Ashrae Transactions, vol. 90, Part 2B, pp. 784-798.
Research Disclosure 17483, Oct. 1978, A Review of Synthetic Oils for Refrigeration Use; K. S. Sanvordenker and M. W. Larime, Ashrae Symposium, Nassau, Jun. 29, 1972.
Performance of Selected Synthetic Lubricants etc., G. Daniel et al., Heat Recovery Systems, vol. 2, No. 4, pp. 359-368, 1982.

Primary Examiner—Ronald C. Capossela
Attorney, Agent, or Firm—Learman & McCulloch

[57] ABSTRACT

A rotary displacement compression heat transfer system and method for improving its efficiency includes a rotary displacement compressor for compressing a refrigerant, a condensor connected with the outlet of the compressor, an evaporator connected with the inlet of the compressor, an oil pump for injecting oil into the compressor, an oil separator for separating out the oil and recirculating it to the compressor, a non-chlorinated fluorinated refrigerant, and a synthetic oil providing an inverse solubility characteristic where a mixture of the refrigerant and oil has two immiscible phases in the compressor's operating temperature range at a weight concentration of oil in the range of about 10-60% and has only one dissolved liquid phase at a temperature in the evaporator's operating range at a weight concentration of oil less than about 5%.

20 Claims, 4 Drawing Sheets

ROTARY DISPLACEMENT COMPRESSION HEAT TRANSFER SYSTEMS INCORPORATING HIGHLY FLUORINATED REFRIGERANT-SYNTHETIC OIL LUBRICANT COMPOSITIONS

BACKGROUND OF THE INVENTION

This invention relates to compression-refrigeration, air conditioning, and heat pump systems in which the refrigerant is compressed in a rotary displacement compressor, the outlet of the compressor is connected to a condenser, the inlet of the compressor is connected to an evaporator, oil is injected into the compressor by an oil injector, oil is separated from the refrigerant and recirculated to the oil injection mechanism, the refrigerant is a fluorinated, non-chlorinated hydrocarbon, and the base lubricant is a polyether polyol or monol.

Numerous studies have linked the presently widely used chlorofluorocarbons with the depletion of the earth's protective ozone layer which protects life on earth from harmful sun rays. It is widely accepted that this depletion of the ozone layer has been the cause of higher skin cancer rates. It is the chlorine in the so-called CFC's, which are currently used in refrigeration and other systems, which reacts with the ozone layer. As a result, by international agreement, the use of highly chlorinated products will be gradually terminated.

One of several refrigerants which has been developed as a substitute refrigerant medium is 1,1,1,2-tetrafluoroethane, also known as refrigerant R-134a, which contains no chlorine or bromine, and does not pose a risk to stratospheric ozone. This refrigerant, which can be manufactured by the method described in U.S. Pat. No. 4,311,863, is thought, accordingly, to be a refrigerant of the future, and it is expected that R-134a will be widely used in oil-flooded rotary displacement compressors.

In the basic, closed, compression refrigeration cycle, liquid refrigerant flows from the condenser under pressure through the expansion valve to the evaporator coils where it evaporates, absorbing heat and cooling the room or other space where cooling is desired. The vapor is then drawn into the compressor where its pressure and temperature are raised. When the hot, high pressure vapor flows from the compressor to the condenser, usually via an oil separator, the condenser cooling liquid removes enough heat from it to condense it. This liquid refrigerant then flows to the evaporator once again. In a single stage system the refrigerant vapor is compressed from suction pressure to condensing pressure in one operation, but multi-stage systems are also utilized in which the vapor is raised to the desired pressure range through a series of consecutive compressions.

Rotary screw compressors employ helical rotary lobe elements in compressing gas, in contradistinction to reciprocating pistons, and operate on the positive displacement principal. The most commonly used rotary screw compressors are of the oil flooded, double helical screw type wherein refrigerant gas is compressed by the action of an intermeshing male and female rotor which turns in a cylinder, the turning rotors drawing gas into the voids formed by the rotor's lobes. As the lobes turn past the intake ports, a charge of gas is trapped and sealed in the adjacent interlobe spaces. As rotation continues, the volume between the discharge end plate of the rotor chamber and the point of rotor mesh decreases. In flooded systems, during compression, oil under pump pressure is sprayed into the cylinder through orifices in the cylinder walls. Compression continues until the end of the female rotor passes over the outlet port so the gas discharges into the system, and normally compression can be accomplished in one stage. Oil is injected directly into the gas stream at the beginning of compression, and intimate contact of the oil spray or mist and gas permits the oil to absorb a considerable amount of the heat of compression.

The lubricant in an oil flooded rotary screw refrigerator system, further, must not only lubricate the bearings and gears, but also aid in sealing the clearance between the screws or lobes and the casing. When, in view of the cooling function which is also to be achieved, a high volume of oil is injected during the compression phase, an important consideration is the diluting effect on viscosity of the dissolved refrigerant. Synthetic lubricants, and particularly certain polygylcols, have been proposed for various chlorinated halocarbon refrigerants, because the final viscosity, under the effects of temperature, pressure, and type of refrigerant, can be higher, even though the solubility of the refrigerant gas in the lubricant is greater, than for a corresponding mineral oil in rotary screw compressors where the sealing effect of the lubricant plays an important role in the overall efficiency. The oils previously proposed for other refrigerants are not suitable for non-chlorinated fluorocarbon refrigerants such as R134a. They too readily dissolve the refrigerant at high temperatures but not at low temperatures. Significant benefits in compressor volumetric efficiency are achievable if the viscosity of the lubricant is not substantially diluted by the refrigerant. Decreased viscosity of the oil film can cause thin film lubrication conditions which result in wear, and affect the ability of the film to adhere to metal surfaces. Further, as indicated, a decreased viscosity provides a less efficient sealing effect so that efficiency losses can be considerable.

The oil-injected compressor also has other efficiency losses when it operates with a lubricant that can dissolve the compressed gas. The lubricant that is injected at an intermediate pressure point in the compressor contains dissolved gas which, when exposed to lower pressure, flashes, and this "free" gas has to be recompressed without doing any real work. Also, some oil within the compressor leaks back to lower pressure regions and, when it contains dissolved gas, this gas boils off and has to be recompressed.

Still further, oil-flooded compressors normally have high pressure oil separators which tend to facilitate the dissolution of the circulated gas refrigerant into the lubricant within the oil separator.

SUMMARY OF THE INVENTION

One of the prime objects of the present invention is to provide a closed heat transfer system having a compressor incorporating a refrigerant-oil composition wherein the lubricant oil will not readily dissolve the refrigerant gas at higher pressures and temperatures but will readily dissolve in it at low pressures and temperatures. Such a lubricant-gas composition permits the oil to be more efficiently separated from the refrigerant gas and, at the same time, to have good "oil return" characteristics from the evaporator.

Another object of the invention is to provide a system of the character described with a lubricant-gas composition wherein, at condensing temperature at the oil separator, there is a maximum resistance to dissolving refrigerant into the oil, and at the evaporator prior to evaporation there is but one phase of liquid, i.e., oil and liquid refrigerant.

Still another object of the invention is to provide a system of the character described wherein the oil-refrigerant composition incorporated with the system provides a thermal and chemical stability which affects the cleanliness of the system and is essential in the maintenance of heat transfer efficiency, while maintaining the efficient functioning of mechanical components such as the expansion valves.

Still another object of the invention is to provide a system of the character described which has good "oil return" characteristics and, under dynamic conditions, does not create a practical problem in the evaporator wherein an oil-rich phase, being of lower density, begins to float on top of a refrigerant-rich phase and create heat transfer and oil return problems.

Still another object of the invention is to provide a system of the type described wherein there is sufficient lubricity and viscosity in the presence of the refrigerant to act as an effective lubricant to prevent mechanical wear and to provide sufficient sealing.

Still another object of the invention is to provide a system with a refrigerant-oil composition wherein the lubricant is fluid over a wide operating temperature range, has a low pour point, has a low floc point, has a low vapor pressure, has a good viscosity-temperature relationship, and is compatible with rubber and the elastomers used in the compressor and other components of the total system.

Still another object of the invention is to provide a system having an oil-refrigerant composition which is sufficiently stable to achieve the efficient, long-lived operation of the system components.

The objects of the present invention have been achieved by incorporating polyoxyalkylene glycols providing a designated inverse solubility with the refrigerant in an oil misted rotary displacement compression heat transfer system with refrigerant R-134a. The invention may be found useful with other compressor heat transfer systems and similar refrigerants.

Other objects and advantages of the invention will be pointed out specifically or will become apparent from the following description when it is considered in conjunction with the appended claims and the accompanying drawings.

IN THE DRAWINGS

GENERAL DESCRIPTION OF THE INVENTION

Figure 1:
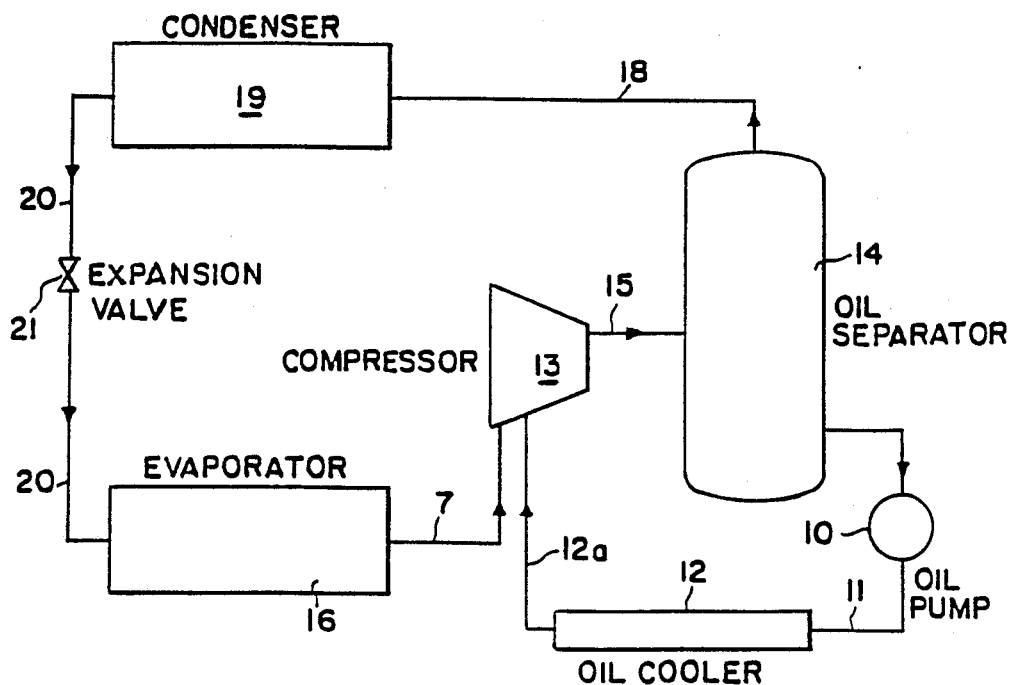
FIG. 1 is a schematic block diagram illustrating a typical, oil-flooded, twin screw, compression heat transfer system.

In FIG. 1 the components of an oil-flooded twin screw, compression system are labeled for purposes of ready identification. In the system illustrated, an oil pump 10 pumps a synthetic oil to be described later, via a line 11, to an oil cooler 12 which supplies it to a compressor 13 via line 12a. The lubricating, cooling, and rotor-sealing oil which is exposed to the refrigerant vapor in the compressor, is returned from the compressor 13 to an oil separator 14 via a line 15. Compressor 13 receives the refrigerant in a gaseous state from the evaporator 16 via a line 7. The vapor is pressurized and "work energy"-heated in the compressor and, after being separated from the oil at separator 14, is moved through a line 18 to a condensor 19 where it condenses or liquifies as a result of the combination of increased pressure and loss of heat. From condensor 19 the liquid proceeds, via a line 20, through an expansion valve 21 to the evaporator 16 where, as a result of its loss of pressure and absorption of heat, it vaporizes. Typically, the refrigerant evaporating temperature is in the temperature range minus 40° C. to plus 20° C., and the refrigerant condensing temperature is in the range plus 30° C. to plus 90° C. The oil separator 14 is capable of separating out a great proportion of the lubricating oil and is aided in this task because, at the temperatures involved, the oil to be more particularly described resists dissolving the refrigerant to be described.

Figure 2:
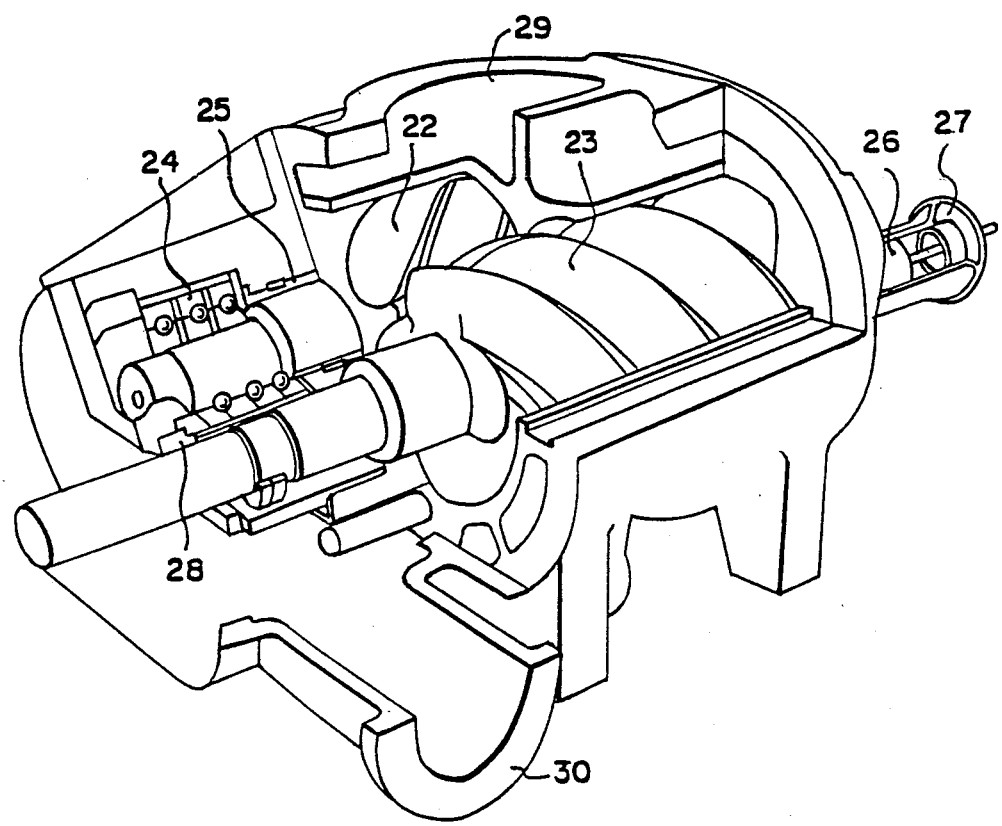
FIG. 2 is a fragmentary schematic view of a typical compressor with a portion of its casing broken away to expose its internal components.

FIG. 2 diagrammatically illustrates a typical rotary screw compressor. Here a female rotor 22, which typically may have six lobes, is mated with a male rotor 23 which typically may have four lobes. A thrust bearing is indicated at 24 and a radial bearing at 25. The sliding valve actuating piston is indicated at 26 and the control cylinder at 27. A shaft seal is, indicated at 28. The suction port which connects with line 7 is indicated at 29 and the discharge port, which communicates with line 15, is indicated at 30. Oil supplied by the external pump 10 is injected along with the suctioned gas from line 7 to lubricate and seal compressor 13. In rotary screw compressors the lobes, bearings, and gears must be lubricated and sealed by the oil. In addition, as noted, the volume of oil injected must be sufficient to cool the compressor.

In a closed system the refrigerant gas and the oil will, to some extent, be mutually soluble or completely miscible dependent on the temperature and the concentration of the oil. At compressor temperatures and pressures when oil floods the compressor, there is a maximum surface exposure of the oil to the refrigerant gas. A liquid oil-rich phase which is essentially oil and a refrigerant-rich gas phase which is essentially refrigerant is the result. The gas phase moves to the condenser along with the portion of the liquid phase which the oil separator cannot remove. Normally, at the condenser, the oil will be present in a concentration of less than 5% whereas in the compressor it will be present in far greater concentration.

Figure 3:
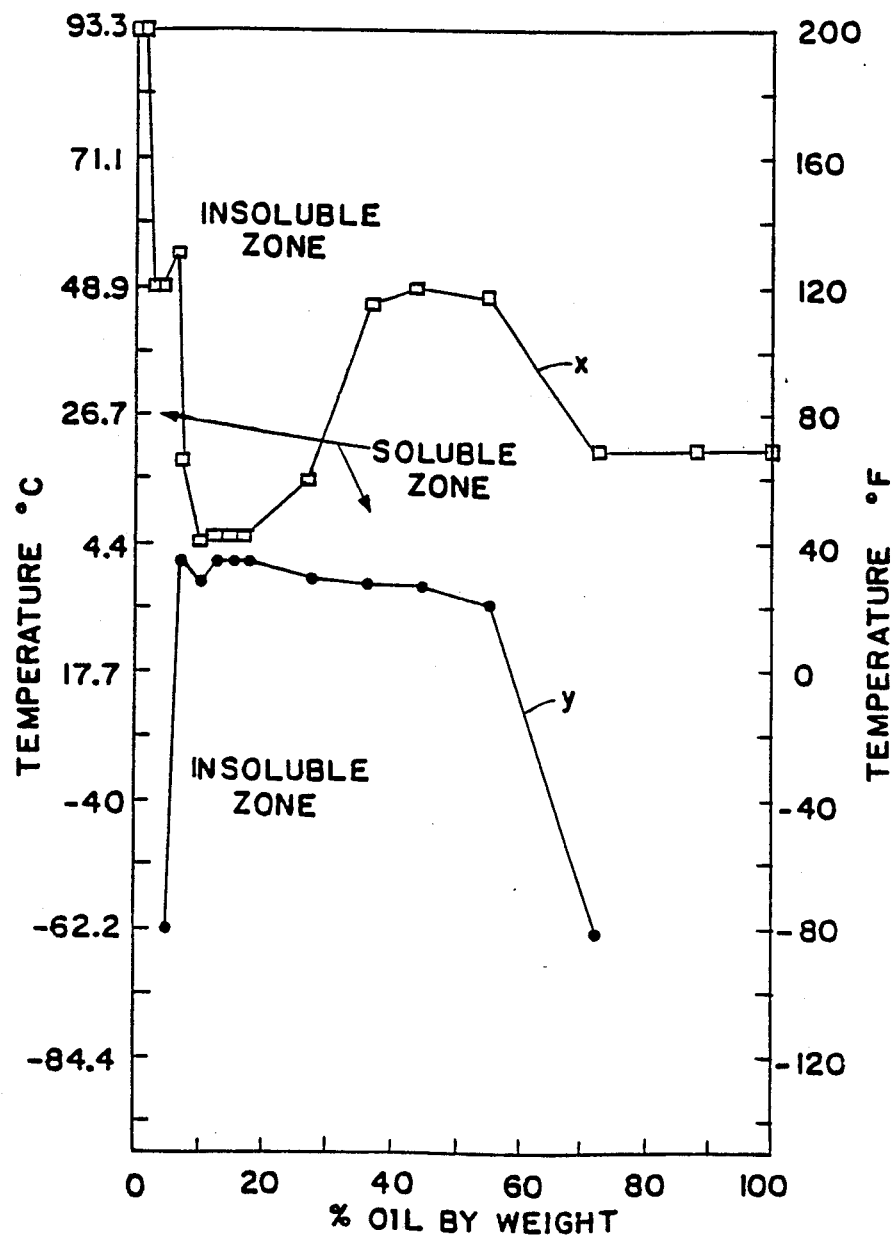
FIG. 3 is a graphical diagram indicating the solubility of the refrigerant and the lubricant oil mixture at various temperatures and concentrations.

In FIG. 3 a miscibility graph has been disclosed which demonstrates an unexpected solubility characteristic in the system's operative temperature ranges. The graph was plotted following tests which indicated what is considered to have been demonstrated by the tests. Here the upper graph line x indicates total immiscibility or insolubility above the line at various temperatures and percentages by weight of oil in the oil-refrigerant. The line x indicates inverse solubility in moving from a downward slope with lower concentrations of oil in the 5% range back to an upward slope at higher compressor temperatures with higher concentrations of oil. Line y plots a lower temperature immiscibility or insolubility of the refrigerant in the oil at other weight concentrations and temperatures below the compressor operating temperatures, but not at concentrations below 5%. Both the lines x and y, with a weight concentration of oil up to 5% demonstrate a soluble zone or zone of complete miscibility where a single phase of liquid, i.e. oil in the refrigerant, is encountered from evaporator discharge temperatures of minus 62.2° C. to plus 20° C. at concentrations of oil around 5%. In the compressor, at the oil separator, and at the condenser inlet, the oil-rich phase and the refrigerant-rich phase form essentially two discrete layers which are insoluble in this two phase zone. The oil-rich layer, because of this, is more efficiently separated from the gas at the high temperature and pressure conditions of oil separator 14. Further, the oil will effectively resist dissolution of the refrigerant-rich component in the compressor at temperatures within the range 30°–93° C., and above. It is believed the concentration of the oil in the one phase will be in the range of about 100–60% while the concentration of oil in the other phase will be in the range of about 0–20%.

At the same time, the dissolved oil can have a good return from the evaporator at the operative temperature range involved, minus 40° C. to plus 20° C., since only one phase of liquid is involved when the oil is present in the range of 20 parts per million to 5% oil.

To alleviate any tendency of the oil to accumulate at the evaporator, an oil still of well known character can be employed to tend to separate the oil from the vapor at the evaporator and return it to the compressor inlet. In some systems the oil can be separated at such a still and the need for an oil separator between the compressor and condenser obviated. In other oil injected screw compression systems, a refrigerant pump injects the oil-refrigerant solution directly to the screw compressor suction, making an oil still, as such, unnecessary.

The foregoing miscibility curves were obtained with refrigerant R-134a. The synthetic oil used was a 150 ISO polyoxyalkylene diol glycol having the generalized formula

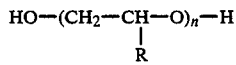

In this formula the integer n has a value of from 5 to 100. R is hydrogen or an alkyl group containing 1–4 carbon atoms. This would also include a copolymer of random distribution and block distribution. Oils of this formulation, having ISO viscosities of 100 and 150, have been tested and found to have the inverse solubility characteristics depicted in FIG. 3. The lubricant was found to remain fluid at low temperatures and the time required for the refrigerant and oil to reach equilibrium was not excessive.

Other oils exhibiting substantially the same inversely soluble characteristic depicted in FIG. 3 are the polyoxyalkylene glycol monols of the structure

Figure 4:
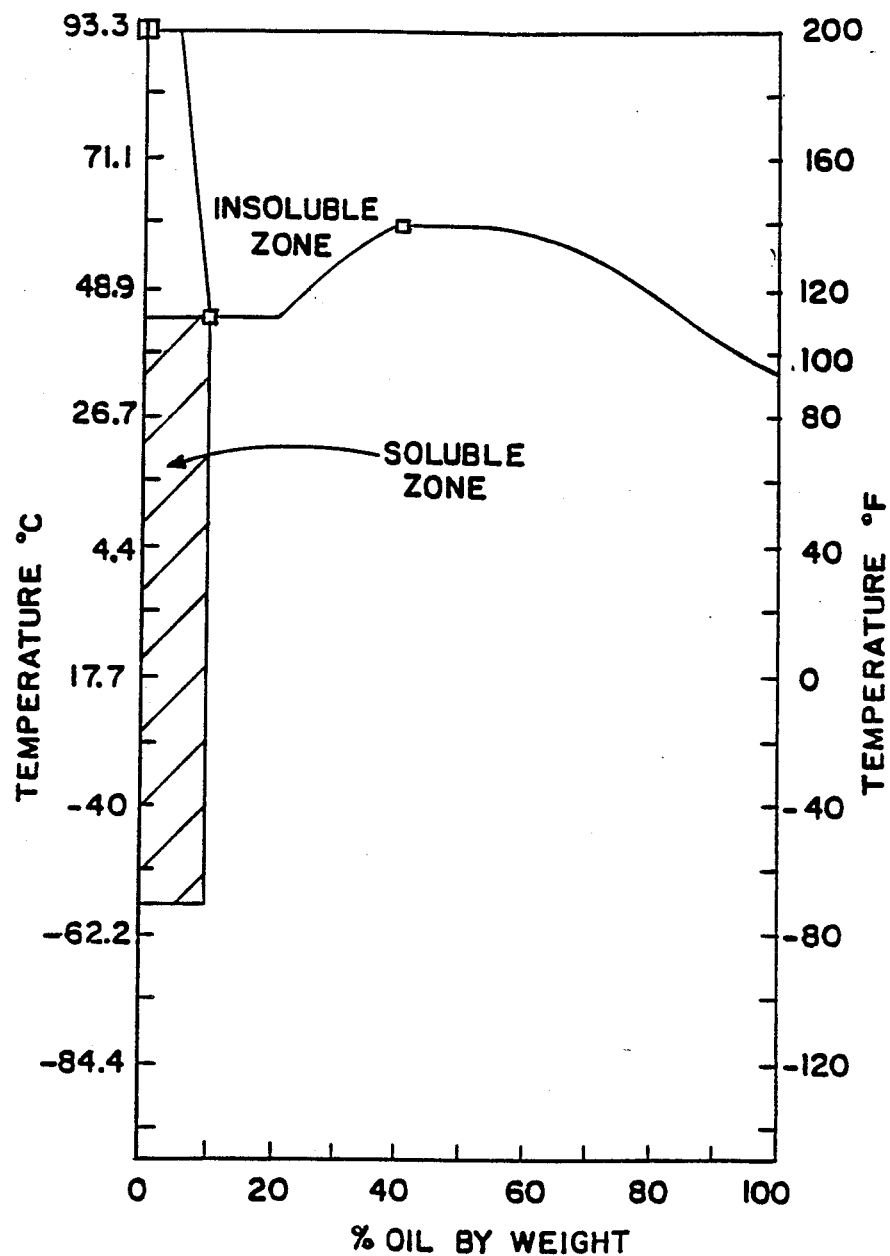
FIG. 4 is a similar diagram using an alternative oil.

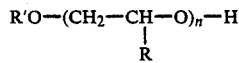

where R is hydrogen or an alkyl group containing 1–4 carbon atoms, R' is selected from the group consisting of linear or branched chain alkyl groups having 1 to about 24 carbon atoms, preferably about 4 to about 8 carbon atoms, and arylalkyl groups wherein the arylalkyl groups have about 6 to about 30 carbon atoms, preferably about 6 to about 15 carbons atoms, and contain a reactive hydrogen atom. Examples of compounds containing a reactive hydrogen atom are alcohols, phenol triols, primary and secondary amines, and carboxylic and sulfonic acids and their amides, and where n=3–70. FIG. 4 discloses a graph which illustrates inverse solubility where the oil used was a 100 ISO oil of this monol formulation.

It is expected that additives for various purposes will be added to the base lubricants disclosed which, however, constitute at least a majority of the complete oil. The complete oil will be essentially water free as usual. The complete oil injected will have a viscosity providing at least 4 centistokes as a sealant in the compressor and preferably 6 centistokes, while providing at least 6 centistokes and preferably 10 centistokes at the compressor bearings. Thus, a base oil of at least about 50 ISO will be selected. The operative temperature ranges normal for rotary displacement oil-flooded compressor operation, whether of the screw or vane type, are plus 30° C. to plus 90° C., although operating temperatures above this, for instance, up to 121° C., are considered practical and within the insoluble zone above line x in either FIG. 3 or FIG. 4. The operative range normal for evaporator operation is minus 40° C. to plus 20° C. and both FIGS. 3 and 4 demonstrate that the soluble zone at oil concentrations of under five per cent, and, in the case of FIG. 4, under 10 per cent, makes possible the desired operation of the system. In FIG. 4 the soluble zone has been cross-hatched between minus 70° F. and plus 110° F., but it is believed the zone extends both above and below the cross-hatched area with a concentration of oil of 10% or less.

While preferred embodiments of the invention have been described in detail, it will be apparent to those skilled in the art that the disclosed embodiments may be modified. Therefore, the foregoing description in all aspects is to be considered exemplary rather than limiting in any way, and the true scope of the invention is that defined in the following claims.

I claim:

1. In a refrigeration or heat pump system including an oil-flooded compressor for compressing a refrigerant, a refrigerant, a condenser in connection with the outlet of the compressor, an evaporator in connection with the inlet of the compressor, an oil, an oil injection means for injecting the oil into the compressor, an oil separator and duct means for recirculating the separated oil to the oil injection means, the improvement wherein the refrigerant is a fluorinated non-chlorinated hydrocarbon and the oil comprises a major oil proportion of such a synthetic type as to provide an inverse solubility characteristic that within a temperature range of +30° C. to +121° C. a mixture incorporating the refrigerant and oil, can form two insoluble phases in the compressor, one an oil-rich phase and the second a refrigerant-rich phase, whereas within a temperature range of −40° C. to +20° C. said mixture can form only one soluble phase in the compressor at a weight concentration of oil to refrigerant less than 5%.

2. A system according to claim 1 wherein said refrigerant is R-134a, and said oil is a polyether polyol or monol.

3. In a refrigeration or heat pump system including a rotary displacement compressor for compressing a refrigerant, a refrigerant, a condenser in connection with the outlet of the compressor, an evaporator in connection with the inlet of the compressor, an oil, oil injection means for injecting the oil into the compressor, an oil separator and duct means for recirculating the separated oil to the oil injection means, the improvement wherein the refrigerant is fluorinated non-chlorinated hydrocarbon and the oil has a major portion of such a polyglycol type as to provide an inverse solubility characteristic that within a temperature range of +30° C. to +121° C. a mixture incorporating the refrigerant and oil can form two insoluble phases in the compressor whereas within a temperature range of −40° C. to +20° C., a liquid mixture of the oil and refrigerant can form only one miscible phase in the compressor at a weight concentration of oil less than 5%.

4. A system according to claim 3 where said refrigerant is R-134a.

5. A system according to claim 4 wherein said oil is selected from a class comprising a polyoxyalklene glycol diol and monol.

6. A system according to claim 4 wherein said oil is a polyoxyalkylene glycol diol of the structure:

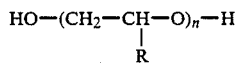

where R=hydrogen or an alkyl group containing 1-4 carbon atoms, and n=5−100.

7. A system according to claim 4 wherein said oil is a polyoxyalklene glycol monol of the structure:

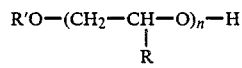

where R=hydrogen or an aklyl group containing 1-4 carbon atoms, R' is selected from the group consisting of linear or branched chain alkyl groups having 1 to about 24 carbon atoms, preferably about 4 to about 8 carbon atoms, and arylalkyl groups wherein the arylalkyl groups have about 6 to about 30 carbon atoms, preferably about 6 to about 15 carbon atoms, and contain a reactive hydrogen atom, and where n=3−70.

8. A closed refrigeration or heat pump system including a compressor for compressing a refrigerant, a non-chlorinated hydrocarbon refrigerant, a condenser in connection with the outlet of the compressor, an evaporator in connection with the inlet of the compressor, an oil, oil injection means for injecting the oil into the compressor, an oil separator and duct means for recirculating the separated oil to the oil injection means, characterized in that the oil and the refrigerant are such that a liquid mixture, incorporating the refrigerant and oil has two insoluble phases in the compressor at a temperature in the range of +30° to +121° C. at a weight concentration of oil in the range of about 10 to 60% and has only one miscible phase in the compressor at a temperature in the range of −40° to +20° C. at a weight concentration of oil less than 5%.

9. A method for improving the efficiency of a refrigeration or heat pump system in which a refrigerant is compressed in a rotary displacement compressor, the outlet of the compressor is connected to a condenser, the inlet of the compressor is connected to an evaporator, oil is injected into the compressor through oil injection means, and oil is separated from the refrigerant and recirculated to the oil injection means, characterized in that the refrigerant is R-134a and the oil injected is a polyglycol that at a temperature within a temperature range of about +30° C. to +121° C. forms a mixture with R-134a that has two insoluble phases in the compressor whereas at a temperature within a temperature range of about −40° C. to +20° C. the mixture is soluble and can form only one liquid phase in the compressor at a weight concentration of oil less than 5%.

10. A method for improving the efficiency of a refrigeration or heat pump system in which a non-chlorinated, fluorinated refrigerant is compressed in a compressor, the outlet of the compressor is connected to a condenser, the inlet of the compressor is connected to an evaporator, the condenser communicates with the evaporator and oil is injected into the compressor through oil injection means, characterized in that a mixture of the refrigerant and oil forms two mutually insoluble phases in the compressor at a temperature within the range of +30° C. to +121° C. at a weight concentration of oil within the range of about 10 to 40% and has only one liquid phase in the compressor at a temperature within the range of about −40° to +20° C. at a weight concentration of oil less than about 5%.

11. A method according to claim 10 in which R-134a is the refrigerant.

12. A method according to claim 10 where said oil is a polyether polyol or monol.

13. A method according to claim 11 wherein said oil is selected from a class comprising a polyoxyalkylene glycol diol and monol.

14. A method according to claim 11 wherein said oil is a polyoxyalkylene glycol diol of the structure:

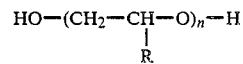

where R=hydrogen or an alkyl group containing 1-4 carbon atoms, and n=5−100.

15. A method according to claim 11 wherein said oil is a polyoxyalklene glycol monol of the structure:

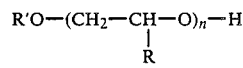

where R=hydrogen or an aklyl group containing 1-4 carbon atoms, R' is selected from the group consisting of linear or branched chain alkyl groups having 1 to about 24 carbon atoms, preferably about 4 to about 8 carbon atoms, and arylalkyl groups wherein the arylalkyl groups have about 6 to about 30 carbon atoms, preferably about 6 to about 15 carbon atoms, and contain a reactive hydrogen atom, and where n=3−70.

16. A closed refrigeration or heat pump system including a compressor for compressing a refrigerant, a non-chlorinated hydrocarbon refrigerant, a condenser in connection with the outlet of the compressor, an evaporator in connection with the inlet of the compressor, an oil, oil injection means for injecting oil into the compressor, an oil separator and duct means for recirculating separated oil to the oil injection means, characterized in that the oil and the refrigerant are such that a liquid mixture, incorporating the refrigerant and oil has two insoluble phases in the compressor at a temperature in the range of +20° to +121° C. at a weight concentration of oil above about 20% and has only one miscible phase at a temperature in the range of −40° to +20° C. at a weight concentration of oil less than 10%.

17. A method for improving the efficiency of a refrigeration or heat pump system in which a non-chlorinated, hydrocarbon refrigerant is compressed in a compressor, the outlet of the compressor is connected to a condenser, the inlet of the compressor is connected to an evaporator, the condenser communicates with the evaporator and oil is injected into the compressor through oil injection means, characterized in that a mixture of the refrigerant and oil forms two mutually insoluble phases in the compressor at a temperature within the range of +30° C. to +121° C. at a weight concentration of oil above about 20% and has only one liquid phase in the evaporator at a temperature within the range of about −40° to +20° C. at a weight concentration of oil less than about 10%.

18. The system of claim 8 wherein said refrigerant is tetrafluoroethane and said oil is a polyoxyalkylene glycol and has a viscosity in said compressor in the range of at least 4-6 centistokes.

19. The system of claim 16 wherein said refrigerant is tetrafluorothane and said oil is a polyoxyalkylene glycol and has a viscosity in said compressor in the range of at least 4-6 centistokes.

20. The system of claim 17 wherein said refrigerant is tetrafluorothane and said oil is a polyoxyalkylene glycol and has a viscosity in said compressor in the range of at least 4-6 centistokes.

* * * * *

UNITED STATES PATENT AND TRADEMARK OFFICE
CERTIFICATE OF CORRECTION

PATENT NO. : 4,916,914
DATED : April 17, 1990
INVENTOR(S) : Glenn D. Short

It is certified that error appears in the above-identified patent and that said Letters Patent is hereby corrected as shown below:

In column 4, line 31, after "is" delete -- the comma --;

In column 6, line 59, change "compressor" to -- evaporator --;

In column 7, line 12, change "compressor" to -- evaporator --;

In column 7, line 55, change "compressor" to -- evaporator --;

In column 8, lines 4 & 5, change "compressor" to -- evaporator --

In column 8, line 18, change "compressor" to -- evaporator --.

Signed and Sealed this

Twenty-seventh Day of August, 1991

Attest:

HARRY F. MANBECK, JR.

Attesting Officer

Commissioner of Patents and Trademarks